Patented May 5, 1925.

1,536,732

UNITED STATES PATENT OFFICE.

OSKAR SPENGLER AND HUGO PFANNENSTIEL, OF DESSAU IN ANHALT, GERMANY, ASSIGNORS TO ACTIEN GESELLSCHAFT FÜR ANILIN FABRIKATION, OF BERLIN.

MANUFACTURE OF VANILLIN.

No Drawing.      Application filed August 1, 1924. Serial No. 729,655.

*To all whom it may concern:*

Be it known that we, OSKAR SPENGLER and HUGO PFANNENSTIEL, citizens of the German Republic, residing at Dessau, in Anhalt, Germany, have invented certain new and useful Improvements in the Manufacture of Vanillin, of which the following is a specification.

It is known that the condensation products of esters of diketone acids or of mesoxalic acid esters with guaicol (obtained by heating these products in 4-dimethyl-amino-1-methylbenzene) may be converted into vanillin (compare Guyot and Gry, Comptes Rendues de l'Académie des Sciences, vol. 149, pages 928–938). This process of manufacture has not attained any technical value, the manufacture of the applied esters being very difficult.

Now we have found that trihalogenmethylguaiacylcarbinol (the condensation product of chloralhydrate with guaiacol, compare Berichte der Deutschen Chemischen Gesellschaft, vol. 56, page 982) may be transformed into vanillin in a very simple manner. By saponification of this trihalogenmethylguaiacylcarbinol, carboxylic acids are obtained which by a suitable oxidizing process yield vanillin with good results.

The following examples serve to illustrate our invention without limiting it:

1. 20 grams of trichlormethylguaiacylcarbinol are heated in a reflux apparatus with 1400 grams of water for 24 hours. 24 grams of ferric chloride are added and the solution is boiled once more for 24 hours. By extraction of the solution 2.5 grams of vanillin are obtained.

2. 50 grams of trichlormethylguaiacylcarbinol are boiled with 4 liters of water in a reflux apparatus for 12 hours. After addition of 75 grams of copper acetate the solution must be still boiled for twelve hours. Then it is evaporated to 2 liters and extracted with ether. The ethereal solution contains 18–20 grams of yellowish crude vanillin.

3. 50 grams of trichlormethylguaiacylcarbinol and 20 grams of copper acetate are boiled with 4 liters of water in a reflux apparatus for 12 hours, a current of air being blown through the solution. From the cooled solution the vanillin is extracted with ether.

4. 20 grams of trichlormethylguaiacylcarbinol are boiled in a reflux apparatus with 1 lither of water for 12 hours. After addition of 30 grams of copper acetate the solution is still boiled for another hour. After this it is heated in a closed vessel to 150° C. for half an hour. The vanillin is extracted from the solution with ether, the yield amounts to 9 grams.

5. 50 grams of trichlormethylguaiacylcarbinol are boiled with 4 liters of water, 30 grams of calcium carbonate being added. After 12 hours 75 grams of copper acetate are added and the solution boiled for 24 hours more. The vanillin may be finished in the described manner.

If in Example 5 the calcium carbonate is replaced by the equivalent quantity of sodium acetate or sodium carbonate one obtains vanillin with a like yield.

What we claim is,—

1. Process for manufacture of vanillin which consists in saponifying and oxidizing trihalogenmethylguaiacylcarbinol.

2. Process for manufacture of vanillin which consists in saponifying and oxidizing trichlormethylguaiacylcarbinol.

In testimony whereof we affix our signatures in presence of two witnesses.

OSKAR SPENGLER.
HUGO PFANNENSTIEL.

Witnesses:
  RUDOLPH FRICKE,
  WILLY STIER.